the entire functional group and not part of a larger functional group. Thus, fatty di-acids are excluded from the present definition since the two —OH units therein are part of a larger acid group.

3,294,683
GREASE COMPOSITION

John D. Stansfield, Stanford-le-Hope, Essex, and Charles Barnes Lancaster, Wirral, England, assignors to Shell Oil Company, New York, N.Y., a corporation of Delaware
No Drawing. Filed Feb. 4, 1964, Ser. No. 342,556
Claims priority, application Great Britain, Feb. 7, 1963, 5,006/63
8 Claims. (Cl. 252—28)

This invention relates to lubricating grease compositions useful at high temperatures. More particularly, it relates to clay-thickened greases which are capable of use in high-temperature applications, for example, above 200° C.

The manufacture of greases gelled with inorganic colloids and particularly with clay has been disclosed in the prior art. In order to maintain the water stability of such greases, it is necessary to provide the clay with hydrophobic surfaces or otherwise to protect it. Various means for thus water-proofing clay have been proposed in the art such as providing hydrophobic surface-active agents including amines, imidazolines, amidoamines and the like.

In making clay-based greases with economic yields, it is necessary to employ a dispersant to ensure that the clay is uniformly dispersed in the oil; and, in order to avoid the use of flame-proof apparatus, relatively high-boiling dispersing agents such as propylene carbonate have been proposed.

Hydroxyl compounds, such as lower glycols, have also been proposed in grease formulations based on silica.

It has now been found that clay-based greases may advantageously be prepared by using an alkyl ester of an inorganic acid, the ester having a boiling point above 100° C. as a dispersant (the expression "alkyl" meaning a radical of an aliphatic hydrocarbon) together with a co-dispersant which is a hydroxyl compound also having a boiling point above 100° C. By using the dispersant and co-dispersant in certain relative proportions it is possible to produce a clay-based grease having superior properties with respect to yield, storage stability and mechanical stability.

Thus, a grease according to the present invention comprises a water-proofed clay, an alkyl ester of an inorganic acid having a boiling point above 100° C. as a dispersant, a hydroxyl compound also having boiling point above 100° C. as a co-dispersant, and a lubricating oil.

The clay thickening agents to be employed are especially selected for use in high-temperature grease compositions due to their relatively inert character at these high operating temperatures. While clays of low base exchange capacity, such as Georgia clay, attapulgite and the like, may be utilized, it is preferred that a high base exchange clay, such as Wyoming bentonite or hectorite, be employed. Clays waterproofed with quaternary ammonium compounds are preferred.

The alkyl ester of an inorganic acid is preferably an alkylene carbonate, such as propylene carbonate, having a boiling point above 200° C. and which is liquid at a temperature below the flash point of the oil employed. The alkyl portion of the alkylene carbonate preferably contains from 2 to 6 carbon atoms, propylene carbonate being particularly preferred.

The hydroxyl compound is any normally liquid organic polyhydroxy compound having a boiling point above 100° C., for example, glycerol or hexylene glycol and preferably one which has a boiling point above 200° C. and is liquid at a temperature below the flash point of the oil.

The term "hydroxy" is meant to include only those compounds in which the substituent hydroxyl groups are the entire functional group and not part of a larger functional group. Thus, fatty di-acids are excluded from the present definition since the two —OH units therein are part of a larger acid group.

The principal classes of polyhydroxy compounds which may be used are polyhydric alcohols, esters of glycols and glycerols with fatty acids and fatty acid esters of polyhydric alcohols and natural products or modified natural products containing these types of compounds. Other aliphatic polyhydroxy compounds may also be used so long as they are within the foregoing limitations as to physical properties.

By the term "normally liquid" is meant that the compound is liquid at normal atmospheric conditions of temperature and pressure, for example, 1 atmosphere and 20° C.

While the present invention is especially suited to high-temperature lubricating greases, such greases may be employed for normal operating conditions as well. Likewise, superior greases for less severe applications can also be made in accordance with the invention by selection of the lubricating oil base stock. In this regard, most mineral oils are stable up to about 300° F., synthetic esters are useful at temperatures up to about 350–400° F. In this latter category are synthetic lubricating oils of known types, such as the phosphorus esters, silicon esters and aliphatic esters formed by esterification of aliphatic dicarboxylic acids with monohydric alcohols and polyphenyl ethers. Typical species of these materials include tricresyl phosphate, dioctyl phthalate, bis(2-ethylhexyl)sebacate, and the like.

Lubricants to be employed at temperatures in excess of about 400° F. are those having an inherent high thermal stability including the halocarbons and organosilicone fluids. The halocarbons may be those described in Peterson et al. patent, U.S. 2,679,479, and include especially the fluorocarbon oils, preferably distilling above about 200° C. at atmospheric pressure. The most useful class of lubricants for grease compositions to be utilized at temperatures in excess of about 400° F. include the organo substituted silicone fluids of lubricating oil viscosity. Of primary interest for this invention are the unreactive thermally stable silicone fluids, which will generally be of the following types:

Methyl silicone fluids

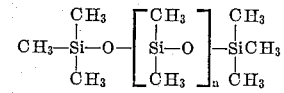

Methyl phenyl fluids

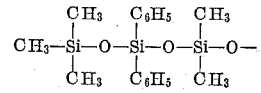

and/or

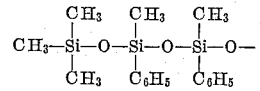

The above types of silicone fluids, in addition to being the most thermally stable, are also the most readily available in commercial quantities. Methyl phenyl fluids are particularly preferred because of their still greater thermal stability.

It will, of course, be recognized, that other organic groups as well as inorganic groups can replace a portion of the methyl groups, e.g., hydrogen, lower alkyls, halogens, etc. They are, however, generally too reactive and/or thermally instable for high-temperature applications, though from the standpoint of mere grease formation and use at temperatures at which they are stable, they are quite satisfactory for the grease compositions of the invention.

The combined amount of dispersant and co-dispersant used in the grease of the present invention is preferably not more than 1.5% by weight based on the total grease composition which generally comprises at least about 6% ture was maintained between 40° C. and 45° C. Finally, the mixture was homogenized in a Manton Gaulin homogenizer at a pressure between 1000 and 5000 p.s.i.g. and allowed to cool.

The following tables give the proportions of the constituents and various properties of greases made by the above procedure.

TABLE I.—PROPYLENE CARBONATE-HEXYLENE GLYCOL DISPERSED

| Ex. | Bentone, 34% wt. | P. C., percent wt. | H. G., percent wt. | Original Penetration | | Final Penetration | | Storage Time, weeks | Worked Penetration, Difference | Rate of Softening Points per Week | SRS after 4 hrs. at 120° C. | Difference |
|---|---|---|---|---|---|---|---|---|---|---|---|---|
| | | | | Unworked | Worked | Unworked | Worked | | | | | |
| 1 | 6 | 0.75 | 0.1 | 257 | 264 | 262 | 283 | 20 | 19 | 0.95 | 334 | 70 |
| 2 | 6 | 0.75 | 0.2 | 281 | 288 | 279 | 307 | 26 | 19 | 0.73 | 337 | 65 |
| 3 | 7 | 0.75 | 0.1 | 249 | 251 | 250 | 267 | 20 | 16 | 0.80 | 322 | 71 |
| 4 | 7 | 0.75 | 0.2 | 248 | 262 | 264 | 279 | 26 | 17 | 0.65 | 339 | 77 |
| 5 | 7 | 0.75 | 0.3 | 254 | 267 | 266 | 280 | 24 | 13 | 0.54 | 331 | 64 |
| 6 | 8 | 0.75 | 0.1 | 243 | 244 | 249 | 257 | 20 | 13 | 0.65 | 314 | 70 |
| 7 | 8 | 0.75 | 0.2 | 230 | 248 | 245 | 261 | 25 | 13 | 0.52 | 327 | 77 |
| 8 | 8 | 0.75 | 0.3 | 248 | 255 | 249 | 265 | 23 | 10 | 0.43 | 305 | 50 |
| 9 | 9 | 0.75 | 0.2 | 231 | 240 | 238 | 248 | 25 | 8 | 0.32 | 323 | 83 |
| 10 | 9 | 0.75 | 0.3 | 226 | 235 | 228 | 253 | 23 | 18 | 0.78 | 284 | 42 |

TABLE II.—0.75% PROPYLENE CARBONATE AND 0.1% GLYCEROL

| Example | Bentone, 34% wt. | Original Penetration, Unworked/Worked | Final Penetration, Unworked/Worked | Worked Penetration Difference | Storage Time, Weeks | Rate of Softening Points per Week | SRS after 4 hrs. at 120° C. | Difference |
|---|---|---|---|---|---|---|---|---|
| 11 | 6.0 | 280/276 | 301/305 | 29 | 31.4 | 0.92 | 328 | 52 |
| 12 | 7.0 | 261/256 | 264/284 | 28 | 33.5 | 0.84 | 301 | 45 |
| 13 | 8.0 | 243/239 | 253/262 | 23 | 33.5 | 0.69 | 297 | 58 |
| 14 | 9.0 | 234/234 | 242/250 | 16 | 33.5 | 0.48 | 291 | 58 |
| 15 | 10.0 | 220/226 | 230/240 | 14 | 33.6 | 0.42 | 289 | 63 |

0.75% PROPYLENE CARBONATE AND 0.2% GLYCEROL

| 16 | 6.0 | 284/288 | 306/308 | 20 | 30 | 0.67 | 339 | 51 |
| 17 | 7.0 | 266/267 | 281/291 | 24 | 29 | 0.83 | 328 | 61 |
| 18 | 8.0 | 254/253 | 264/258 | 5 | 29 | 0.17 | 309 | 56 |
| 19 | 9.0 | 239/240 | 249/249 | 9 | 29.6 | 0.3 | 282 | 42 |
| 20 | 10.0 | 234/232 | 240/243 | 11 | 30 | 0.37 | 255 | 23 |

0.75% PROPYLENE CARBONATE AND 0.3% GLYCEROL

| 21 | 6.0 | 276/279 | 282/310 | 31 | 26 | 1.19 | 336 | 57 |
| 22 | 7.0 | 255/258 | 261/275 | 17 | 25.8 | 0.66 | 302 | 44 |
| 23 | 8.0 | 252/248 | 250/262 | 14 | 25.6 | 0.55 | 277 | 29 |
| 24 | 9.0 | 244/244 | 249/258 | 14 | 30 | 0.47 | 261 | 17 |
| 25 | 10.0 | 235/240 | 243/251 | 11 | 25 | 0.44 | 250 | 10 | clay. It is preferred to use no more than about 1.0% by weight each of dispersant and co-dispersant and preferably even less. Good results have been obtained with 0.75% propylene carbonate with 0.2% hexylene glycol. In general the co-dispersant should be from 0.02 to 0.5% by weight of the composition.

The present invention is further illustrated by the following examples. A number of greases were made by the following procedure.

At ambient temperature a proprietary clay, waterproofed with a quaternary ammonium compound, was mixed with sufficient lubricating oil to form a smooth paste. To this paste there was then added approximately 90% of a total amount of lubricating oil to be used, i.e., an oil produced by solvent extraction from a naphthenic mineral oil stock having a viscosity at 140° F. of about 170 seconds Redwood and a medium viscosity index and known as MVIN 170 and the whole stirred until a uniform mixture was obtained. This mixture was then heated to a temperature between 40 and 45° C. At this temperature the dispersant, the co-dispersant and the remainder of the oil were slowly added. The resulting mixture was stirred and circulated for a minimum period of one hour, circulation involving passage through one or more nozzles provided with 3/32" diameter holes, at a pressure of 75 p.s.i.g. During this period the tempera- In connection with the foregoing specific examples, it is noted that an increase of softening during storage of less than one point per week is considered satisfactory. The abbreviation S.R.S. stands for "Shell Roll Stability" and gives the penetration of a grease after being subjected to the action of a roller of specified weight and dimensions under specified conditions. It is a measure of the mechanical stability of a grease.

All references herein to boiling points and states of substances are considered to be made at atmospheric pressure.

We claim as our invention:
1. A grease composition consisting essentially of (1) a major amount of lubricating base oil gelled to a grease consistency with (2) a minor thickening amount of colloidally dispersed water-proofed clay and (3) 0.04–1.5% by weight of the total composition of a two-component dispersant consisting of (a) 0.02–1% by weight of a normally liquid aliphatic polyhydric alcohol having a boiling point above 100° C. and (b) 0.02–1% by weight of an alkyl ester of an inorganic acid, said ester having a boiling point above 200° C., basis total grease composition.

2. A grease composition consisting essentially of (1) a major amount of lubricating base oil gelled to a grease consistency with (2) a minor thickening amount of colloidally dispersed water-proofed clay and (3) 0.04–1.5% by weight of the total composition of a two-component dispersant consisting of (a) 0.02–1% by weight of a normally liquid aliphatic polyhydric alcohol having a boiling point above 100° C. and (b) 0.02–1% by weight of an alkylene carbonate having a boiling point above 200° C., the alkyl portion of which contains 2 to 6 carbon atoms.

3. The grease composition of claim 2 in which the alkylene carbonate is propylene carbonate.

4. The grease composition of claim 2 in which the polyhydric alcohol is glycerol.

5. The grease composition of claim 2 in which the polyhydric alcohol is hexylene glycol.

6. The grease composition of claim 2 in which the polyhydric alcohol has a boiling point above 200° C. and is liquid at a temperature below the flash point of the oil.

7. The grease composition of claim 1 in which the amount of dispersant is from 0.02 to 0.5% by weight of the total grease composition.

8. The grease composition of claim 7 in which the dispersant consists of (a) 0.2% by weight of hexylene glycol and (b) 0.75% by weight propylene carbonate.

References Cited by the Examiner

UNITED STATES PATENTS

| | | | |
|---|---|---|---|
| 2,647,872 | 8/1953 | Peterson | 252—28 |
| 2,662,056 | 12/1953 | McCarthy | 252—28 |
| 2,676,925 | 4/1954 | Lindstrom et al. | 252—25 |
| 2,820,764 | 1/1958 | Hughes et al. | 252—25 |
| 2,939,840 | 6/1960 | Fronczak | 252—28 |

OTHER REFERENCES

"Manufacture and Application of Lubricating Greases" by Boner, Reinhold Pub. Corp., New York, 1954, pp. 679, 680, 725 and 728–732.

DANIEL E. WYMAN, *Primary Examiner.*

I. VAUGHN, *Assistant Examiner.*